United States Patent [19]
Hay

[11] Patent Number: 5,711,594
[45] Date of Patent: Jan. 27, 1998

[54] TUBULAR EL LAMP

[75] Inventor: William E. Hay, Gilbert, Ariz.

[73] Assignee: Durel Corporation, Chandler, Ariz.

[21] Appl. No.: 343,320

[22] Filed: Nov. 22, 1994

[51] Int. Cl.⁶ .............. G01D 11/28; F21S 3/00; H05B 33/00

[52] U.S. Cl. .............. 362/84; 362/23; 362/26; 362/217; 362/255; 313/512

[58] Field of Search .............. 362/84, 23, 26, 362/217, 255; 313/512; 116/48, 286, DIG. 35, DIG. 36

[56] References Cited

U.S. PATENT DOCUMENTS

| | | | |
|---|---|---|---|
| 3,067,352 | 12/1962 | Vodicka et al. | 362/255 |
| 3,089,973 | 5/1963 | Herold et al. | 313/512 |
| 3,094,970 | 6/1963 | Zargarpur | 116/129 |
| 3,157,813 | 11/1964 | Bowser et al. | 313/512 |
| 3,166,687 | 1/1965 | Veres | 313/512 |
| 3,219,008 | 11/1965 | Harris et al. | 116/286 |
| 3,317,722 | 5/1967 | Whitney | 362/84 |
| 3,359,445 | 12/1967 | Roth | 313/512 |
| 4,357,557 | 11/1982 | Inohara et al. | 313/512 |
| 4,559,582 | 12/1985 | Scardilli et al. | 362/23 |
| 4,959,759 | 9/1990 | Kohler | 362/84 |
| 5,178,447 | 1/1993 | Murase et al. | 362/31 |
| 5,257,167 | 10/1993 | Clem | 362/23 |

*Primary Examiner*—Ira S. Lazarus
*Assistant Examiner*—Matthew Spark
*Attorney, Agent, or Firm*—Paul F. Wille

[57] ABSTRACT

An EL lamp includes a strip of EL material within a translucent cylinder, preferably a glass tube. The tube can be frosted or coated to further enhance the appearance of the lamp. The strip can be flat or curved and, in an alternative embodiment of the invention, the lamp includes a glass fiber between the light emitting surface of the strip and the tube for gathering light from the strip and emitting the light in a preferred direction. The tube is an optical element combined with the strip to produce the unexpected result of having the tube appear luminous, even without coatings to enhance this effect.

15 Claims, 1 Drawing Sheet

TUBULAR EL LAMP

BACKGROUND OF THE INVENTION

This invention relates to electroluminescent (EL) lamps and, in particular, to a tubular EL lamp having a strip of EL material in a translucent or transparent cylinder.

An EL lamp is essentially a capacitor having a dielectric layer between two conductive electrodes, one of which is transparent. The dielectric layer includes a phosphor powder which radiates light in the presence of a strong electric field, using very little current. For EL lamps in the form of a flat panel, the front electrode is typically a thin, transparent layer of indium tin oxide or indium oxide and the rear electrode is typically a polymer binder, e.g. polyvinylidene fluoride (PVDF), polyester, vinyl, or epoxy, containing conductive particles such as silver or carbon. The front electrode is applied to a polymer film, such as polyester or polycarbonate, which provides mechanical integrity and support for the other layers. In the early days of electroluminescence (1950's), one or both electrodes were glass plates with transparent conductive coatings.

An EL lamp has a distinct advantage in displays in that the lamp is both reflective and luminous. Another advantage of EL lamps is extremely low power consumption, i.e. the lamps produce almost no heat. A problem with EL lamps is that, if a sheet of EL material is cut into a narrow, luminous strip, the strip is not mechanically strong. One can use a wide strip and mask a substantial portion of the strip to produce a narrow, luminous band but this wastes lamp material and the wide strip may not fit within the space available.

A narrow strip of EL material, e.g. less than 0.25 inches (6 mm.) wide, has many uses such as decorative lighting, highlighting edges or boundaries in a display, a three dimensional graphic, indicia in a display, and as moving pointers in gauges. It is a problem to provide adequate support for the strip. A pointer is typically over one inch long and is preferably less than 0.1 inch wide. Since a pointer typically pivots about one end, a pointer must be self-supporting and relatively rigid. Typical EL material is not self-supporting out of the plane of the sheet.

EL lamps can be produced in a variety of colors, enabling one to produce dazzling displays that are visually rich and entertaining and to produce displays of information that are readily comprehended qualitatively and quantitatively. It is highly desired to obtain a rugged, narrow EL lamp for such displays, particularly for instrument panels in vehicles. In automobiles or other vehicles, ambient temperature, pressure, and humidity can vary widely and an instrument panel can be subjected to vibration in excess of 1 g. Providing a long, narrow, yet rugged lamp for such applications is difficult.

Moving pointers including an EL lamp are known in the prior art. For example, U.S. Pat. No. 3,094,970 (Zargarpur) discloses a gauge having a moving pointer coated with EL phosphor. Translucent pointers are disclosed in U.S. Pat. No. 4,559,582 (Scardilli et al.) and in U.S. Pat. No. 4,959,759 (Kohler). In the Scardilli et al. patent, a one-piece, translucent member includes a pointer and an orthogonal shaft. The shaft is concentric within a cylindrical EL lamp located behind the faceplate of the gauge and light from the EL lamp is coupled by the shaft through the faceplate to the pointer. In the Kohler patent, an annular EL lamp is concentric with a shaft on which a translucent pointer is mounted. The base of the pointer is an enlarged, circular area for gathering light from the EL lamp.

Of the patents listed above, only the Zargarpur patent discloses a lamp/pointer. The other patents disclose an EL lamp combined with a light pipe. A problem with the pointer disclosed in the Zargarpur patent is that the lamp is difficult to make. Whether a narrow EL lamp is functional or is decorative, the lamp must be relatively easy and inexpensive to make. Specifically, making the lamp rugged cannot add significantly to the cost of the lamp.

Another problem with the pointer disclosed in the Zargarpur patent is that the pointer is dim in comparison to pointers illuminated with other sources of light, such as an incandescent lamp. In addition to providing a narrow, mechanically rugged EL lamp, it is desired to improve the brightness of an EL lamp.

In view of the foregoing, it is therefore an object of the invention to provide a narrow, rugged EL lamp.

Another object of the invention is to provide a narrow, rugged EL lamp that is easily manufactured.

A further object of the invention is to provide an EL lamp including a narrow EL sheet in a translucent cylinder for supporting the sheet and for improving the optical characteristics of the lamp.

Another object of the invention is to provide a narrow EL sheet in a translucent cylinder, wherein the cylinder has a cross-section in the shape of a curve.

A further object of the invention is to provide a narrow EL sheet in a translucent cylinder, wherein the cylinder has a cross-section in the shape of a polygon.

Another object of the invention is to provide a rugged EL lamp having a maximum width of less than 0.25 inches (6 mm.), preferably less than 0.10 inches (1.2 mm), and a length at least ten times the width.

SUMMARY OF THE INVENTION

The foregoing objects are achieved in this invention in which an EL lamp includes a strip of EL material within a translucent cylinder, preferably a glass tube. The tube can be frosted or coated to further enhance the appearance of the lamp. The strip can be flat or curved and, in an alternative embodiment of the invention, the lamp includes a glass fiber between the light emitting surface of the strip and the tube for gathering light from the strip and emitting the light in a preferred direction. As used herein, "strip" refers to what would ordinarily be considered a completed lamp, i.e. two electrodes with a dielectric in between. The tube is not an electrode but an optical element combined with the strip to produce the unexpected result of having the tube appear luminous, even without coatings to enhance this effect.

BRIEF DESCRIPTION OF THE DRAWINGS

A more complete understanding of the invention can be obtained by considering the following detailed description in conjunction with the accompanying drawings, in which.

3

Figures 6, 10, 11:
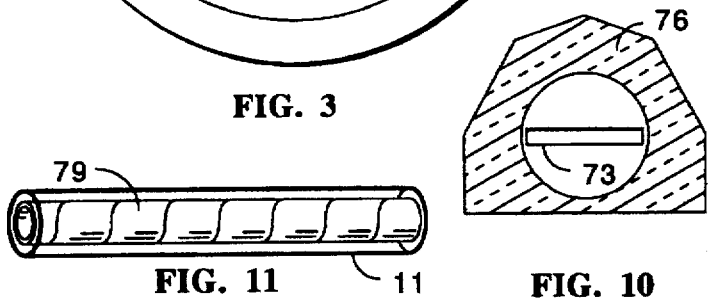
FIG. 6 illustrates a lamp constructed in accordance with the invention in which the lamp includes an optical fiber.
Figure 9:
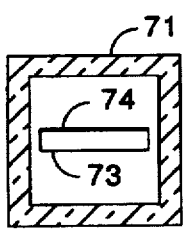
Figure 8:
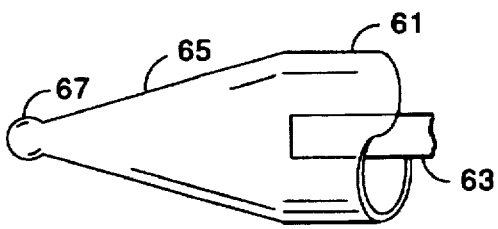
Figure 7:
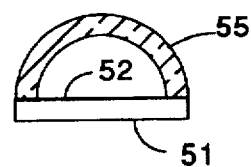

FIG. 7 illustrates a lamp including a semi-circular cylinder of translucent material;

FIG. 8 illustrates a tapered, closed end of an EL lamp constructed in accordance with the invention;

FIG. 9 is a cross-section of an EL lamp having a rectangular cross-section;

FIG. 10 is an alternative embodiment of an EL lamp having a polygonal cross-section; and FIG. 11 is an alternative embodiment of the invention in which the EL sheet is helical.

DETAILED DESCRIPTION OF THE INVENTION

Figure 1:
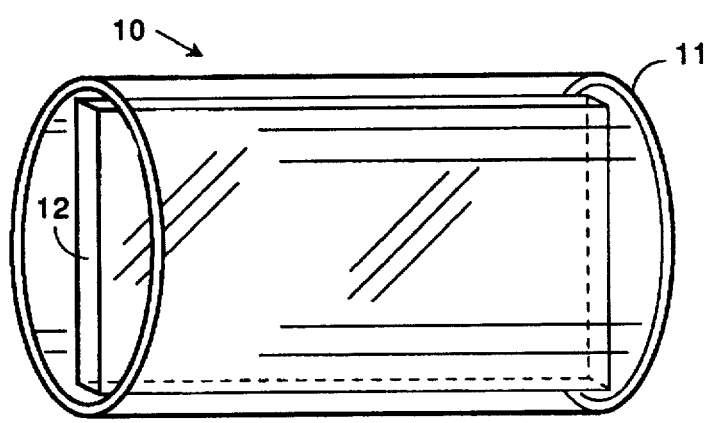
FIG. 1 illustrates an EL lamp constructed in accordance with a preferred embodiment of the invention.

In FIG. 1, lamp 10 includes tube 11 and strip 12 of EL material extending longitudinally inside the tube. Strip 12 can be any suitable electroluminescent material and is preferably constructed as described above, i.e. on a polyester or polycarbonate substrate. Tube 11 is any suitable translucent or transparent material including glass, quartz, acrylic, polycarbonate, or other plastics. Tube 11 can be frosted, on the inside or the outside, or the tube can be coated with a translucent film for modifying the color of the light from EL strip 12. In an alternative embodiment of the invention, tube 11 includes filler material for modifying the reflectance or refractance of the tube, e.g. to provide an iridescent appearance.

In one embodiment of the invention, tube 11 was a glass capillary having an outside diameter of 0.0555 inches (1.41 mm), inside diameter of 0.0416 inches (1.05 mm), and a length of 4.625 inches. A five inch long strip of electroluminescent material having a width of 0.040 inches was inserted into the tube. When an AC voltage is applied to the strip, the light produced by the strip is redirected by tube 11 in such a way that the strip largely disappears. That is, one sees a luminous glass tube and not the strip within. Frosting or coating tube 11 either on the inside or on the outside further enhances this effect. Seeing a luminous tube and not the strip has the advantage of permitting one to use strips which have a border, e.g. for sealing the strip, and which do not produce light at the border.

Figure 2:
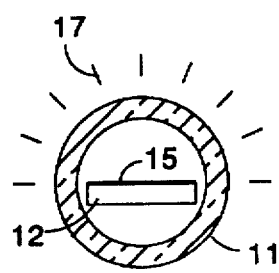
FIG. 2 is a cross-section of the lamp shown in FIG. 1.

FIG. 2 is a cross-section of lamp 10 in which upper surface 15 of strip 12 is the surface from which light emanates. As indicated by rays 17, the light from strip 12 is radiated over an angle of 180° around the longitudinal axis of tube 11. If tube 11 were coated or frosted, the light would be radiated over a greater angle, depending upon whether or not the coating were completely around the tube and how heavily coated the tube was. A tube frosted completely around can emit light over an angle of 360° even with a flat EL strip.

Lamp 10 is assembled by cutting a sheet of electroluminescent material into a plurality of long strips. Each strip is inserted longitudinally into a tube and has sufficient mechanical rigidity to be pushed into the tube without binding. Drawing strip 12 into tube 11 with a slight vacuum further enhances the assembly of lamp 10. Alternatively, a leader can be attached to the strip and inserted into the tube to draw the strip through the tube.

Strip 12 is held in place by friction or by a dab of adhesive at either end of the strip. Electrical connection is made to strip 12 at metallized contact areas (not shown) provided on the surface of the strip at one end. There are several different techniques known in the art for making contact to an EL strip and any of these can be used with a lamp constructed in accordance with the invention. The choice of technique depends upon the application for the lamp.

Figure 3:
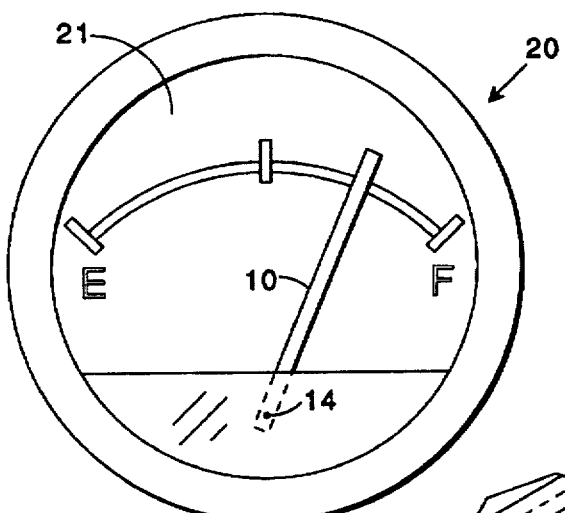
FIG. 3 is a front view of a gauge incorporating an EL lamp constructed in accordance with the invention.

FIG. 3 illustrates gauge 20 having lamp 10 constructed in accordance with the invention. As a pointer, it is preferred

4 that lamp 10 have a diameter of 0.1 inches or less. Lamp 10 is attached to pivot 14 at one end of the lamp for rotating the lamp relative to face 21, thereby providing an indication of some data by the position of lamp 10 relative to scale 19. Face 21 is preferably an EL lamp with a graphics overlay or overprint for providing the scale and other information. Since an EL lamp is reflective, lamp 10 is clearly visible against face 21 even when the lamp is off.

Contact to the electroluminescent strip in pointer 10 can be made by a wiping contact area as known per se in the art, by a flexible lead, such as disclosed in co-pending application Ser. No. 08/310,428 filed Sep. 22, 1994, entitled "*Moving Pointer with Edgewise EL Lamp*", or by other techniques known to those of skill in the connector art.

Figure 4:
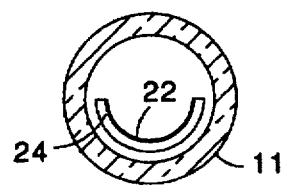
FIG. 4 illustrates a lamp constructed in accordance with the invention in which the EL sheet is concave.

In the embodiment of FIG. 1, the inside diameter of tube 11 is greater than or equal to the width of strip 12. FIG. 4 illustrates an alternative embodiment of the invention in which the electroluminescent strip has a width greater than the inside diameter of tube 11. In FIG. 4, light emanates from surface 22 of strip 24. Strip 24 is curved longitudinally, causing surface 22 to become concave. The particular curvature of strip 24 is a matter of design and the strip need not conform to the inner surface of tube 11. A flat EL strip can be curved to fit the tube or an EL strip can be pre-formed in a particular shape. A pre-formed strip is slightly stiffer, making it easier to insert the strip into the tube.

The curvature of strip 24 permits a wider lamp to be inserted into the tube, increasing the emitting area, and changes the brightness curve of the lamp. Although all of the light is no longer directed primarily upward from a horizontal plane (as the lamp is positioned in FIG. 4), the light emitted to the side is refracted by the tube and redirected upward. A lamp constructed as shown in FIG. 4 emitted light over an angle of 180° about the longitudinal axis of the tube.

Figure 5:
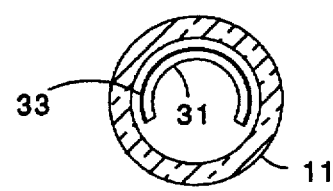
FIG. 5 illustrates a lamp constructed in accordance with the invention in which the EL sheet is convex.

In FIG. 5, strip 31 is wider than the inside diameter of tube 11 and light emanates from surface 33 of the strip. Strip 31 is curved longitudinally, causing surface 33 to be on the outside or convex side of the strip. Light emanating from strip 31 is refracted by the translucent tube to provide improved light distribution over an angle of about 270° about the longitudinal axis of the tube. The angle depends upon the curvature of the strip and whether or not the tube is coated.

FIG. 6 illustrates an alternative embodiment of the invention in which the light is refracted by a compound optic including the tube and a glass fiber. Strip 41 is curved longitudinally to form a concave light emitting surface. Optical fiber 42 is positioned between the light emitting surface and tube 11. Light emanating from the concave surface of strip 41 is gathered by optical fiber 42 and concentrated along a line between fiber 42 and strip 41.

Optical fiber as used in the telecommunications industry typically includes a glass core having a first index of refraction and a glass coating having a second index of refraction. Light incident upon the coating at a low angle is reflected down the length of the fiber by the coating. Protective outer coatings, such as plastic, may also be provided.

One embodiment of the invention uses an optical fiber with a portion of the reflective coating removed along the length of the fiber. The side of the fiber with the coating removed faces the luminous surface of EL strip 41. Light is refracted by the fiber and directed vertically out from the tube, as the lamp is oriented in FIG. 6, producing a bright line. Some light is also conveyed down the length of the fiber and is emitted longitudinally unless the end of the fiber has an opaque coating. The end of the fiber can be curved toward a viewer of the lamp or can be optically coupled to a diffuser to provide a bright dot at the end of the lamp. The optical fiber and the EL strip need not be the same length, depending upon the optical effect desired.

The tube is a cylindrical surface of finite thickness which has a cross-section in the shape of a curve or a polygon. Since light emanates from only one of the major surfaces of the electroluminescent strip, it is not necessary that tube 11 have a cross-section in the shape of a closed curve or figure, e.g. the tube and strip together can form a closed curve or figure. FIG. 7 illustrates an alternative embodiment of the invention in which tube 55 is a semicircular cylinder. Electroluminescent strip 51 is preferably flat and has light emitting surface 52 adjacent tube 55.

As shown in FIG. 1, tube 11 is open at both ends. In some applications, it may be desirable to close either or both ends of the tube, e.g. to contain a solid, liquid, gel, or gaseous fill material. Some electroluminescent strips are sensitive to moisture and means must be provided for sealing the edges of a strip to protect the phosphor from moisture. In accordance with the invention, a tube can be filled with dry air or inert gas and sealed at both ends, thereby protecting the phosphors in the strip.

Alternatively, one may wish to close just one end of the lamp to provide a sharp tip for a pointer. As illustrated in FIG. 8, tube 61 includes tapered portion 65 terminating in point 67. Point 67 can be softened to provide a spherical tip, as shown, or can be left with a sharp end. If point 67 is frosted and the lamp contains an optical fiber, the point is a bright dot at the end of the lamp.

The embodiments of FIGS. 1–6 may become rotated inadvertently because of the circular cross-section of tube 11. The embodiment of FIG. 7 prevents this by providing a flat reference surface, the underside of strip 51. An alternative embodiment is to provide a glass tube having a cross-section in the shape of a polygon. As illustrated in FIG. 9, tube 71 encloses electroluminescent strip 73 having light emitting surface 74. Strip 73 need not be parallel with any side. For example, a wider strip can be inserted into tube 71 if strip 73 were located diagonally within the tube.

Various optical effects can be obtained from tubes of different cross-sections. In FIG. 10, a corner is located directly above strip 73 in a seven sided figure. With strip 73 oriented as shown in FIG. 10, one obtains a narrow, slightly brighter line down the center of the front of the lamp. Although strip 73 is shown in FIGS. 9 and 10 as planar, it is understood that strip 73 can be curved and that an optical fiber can be added to a lamp having a polygonal cross-section. Tube 76 can be molded or extruded in the shape shown. Alternatively, a cylindrical tube of circular cross-section can be overmolded with the same or different material to produce tube 76. For example, an acrylic tube of circular cross-section can be overmolded with acrylic to produce tube 76.

The electroluminescent strip need not be curved longitudinally but can be curved in any desired direction. FIG. 11 illustrates an embodiment of the invention in which a strip of EL material is wound on a mandrel to form helix 79 which is then inserted into tube 11 and the mandrel withdrawn, leaving the helical EL strip behind. Helical EL strip 79 has the advantage of radiating 360° about the longitudinal axis of tube 11 and the advantage of being flexible, enabling one to use a flexible tube if desired. The lamp of FIG. 11 can be curved in any direction whereas the lamp of FIG. 2 cannot be curved in a direction in the plane of strip 12.

The invention thus provides a narrow, rugged EL lamp that is easily manufactured and which has improved optical characteristics over an electroluminescent strip. Fine line pointers are readily provided having a maximum width of considerably less than 0.10 inch in any desired length.

Having thus described the invention, it will be apparent to those of skill in the art that various modifications can be made within the scope of the invention. For example, the tube can be faceted, either radially as shown in FIG. 10 or longitudinally or both. More than one EL strip can be included in a tube, e.g. a pair of strips facing in opposite directions can be used to provide light in a full circle around the longitudinal axis of a lamp. Strips of different colors in the same tube can be used as a pointer which changes color to indicate an alarm condition. A lamp constructed in accordance with the invention can be an integral component of a larger device, e.g. one or more lamps can be cast into a plastic strip to make an edge marker or a large pointer.

What is claimed is:

1. An electroluminescent lamp comprising:
   a translucent tube having a length between two ends; and
   a strip of electroluminescent material extending along said length, wherein said tube has an inside diameter and said strip is wider than said inside diameter and said strip is convex.

2. The lamp as set forth in claim 1 wherein said strip is helical within said tube.

3. The lamp as set forth in claim 1 wherein at least one end of said tube is sealed.

4. The lamp as set forth in claim 1 wherein said tube is glass.

5. The lamp as set forth in claim 1 wherein said tube is frosted on either the inside or the outside.

6. The lamp as set forth in claim 1 and further including a coating on either the inside or the outside of said tube for modifying the light from said electroluminescent strip.

7. The lamp as set forth in claim 1 wherein said tube is translucent plastic.

8. The lamp as set forth in claim 1 wherein said tube has an outside diameter of less than 0.10 inches.

9. An electroluminescent lamp comprising:
   a translucent tube having a length between two ends; and
   a trip of electroluminescent material extending along said length wherein said strip is helical within said translucent tube.

10. An electroluminescent lamp comprising:
    a translucent tube having a length between two ends; and
    a strip of electroluminescent material extending along said length, wherein said tube has an inside diameter and said strip is wider than said inside diameter and said strip is concave.

11. The lamp as set forth in claim 10 wherein said lamp includes an optical fiber extending along said length between said strip and said tube.

12. A gauge for indicating a measured value, said gauge having a dial and a movable pointer positioned adjacent said dial wherein said pointer comprises:
    a translucent tube having a length between two ends; and
    a strip of electroluminescent material extending within said tube and supported by said tube along said length;
    wherein said tube refracts light from said strip when said strip is luminous and said pointer reflects incident light when said strip is non-luminous to provide an indication on said dial of said measured value.

13. The gauge as set forth in claim 12 wherein said tube is frosted on either the inside or the outside.

14. The gauge as set forth in claim 12 and further including a coating on either the inside or the outside of said tube for modifying the light from said strip.

15. The gauge as set forth in claim 12 wherein said tube has an outside diameter of less than 0.10 inches.

* * * * *